United States Patent [19]
Leung et al.

[11] Patent Number: 4,883,847
[45] Date of Patent: Nov. 28, 1989

[54] PROCESS TO TERMINATE AN OLEFIN POLYMERIZATION REACTION

[75] Inventors: Linus Leung, Naperville, Ill.; John B. Rogan, Tarpon Springs, Fla.

[73] Assignee: Amoco Corporation, Chicago, Ill.

[21] Appl. No.: 263,000

[22] Filed: Oct. 27, 1988

[51] Int. Cl.$^4$ ............................. C08F 2/42; C08F 6/12
[52] U.S. Cl. ......................................... 526/84; 526/82; 526/237; 526/290; 526/347.1; 526/348.7; 526/351; 528/499
[58] Field of Search ............... 526/84, 82, 237, 348.7, 526/347.1, 351, 290; 528/499

[56] References Cited
U.S. PATENT DOCUMENTS

| 2,099,090 | 11/1937 | Webb | 526/84 |
| 2,474,571 | 6/1949 | Brakeley et al. | 526/84 X |
| 2,553,426 | 5/1951 | Schutze | 526/84 |

Primary Examiner—Joseph L. Schofer
Assistant Examiner—F. M. Teskin
Attorney, Agent, or Firm—Matthew R. Hooper; William H. Magidson; Ralph C. Medhurst

[57] ABSTRACT

A method is disclosed for terminating a polymerization reaction of reactive olefins and a Lewis acid catalyst wherein the reaction is killed almost instantaneously to prevent an explosion. The material added to terminate the reaction is non-toxic and is easily removable in further processing.

7 Claims, No Drawings

PROCESS TO TERMINATE AN OLEFIN POLYMERIZATION REACTION

FIELD OF THE INVENTION

This invention relates to a method of promptly terminating catalytic action of a Lewis acid-type catalyst, such as aluminum chloride, $AlCl_3$, present in a reactor containing reactive olefin hydrocarbons wherein the olefin hydrocarbons are being polymerized into polymers and to the recovery of the olefin hydrocarbons and polymers in the reactor.

The termination of the catalytic activity of the $AlCl_3$ is accomplished by the dispersing into the reactor a stream which contains a water-soluble, hydrocarbon-miscible glycol ether, preferably diethylene glycol dimethyl ether (diglyme), wherein the reactor contains a reactive hydrocarbon such as isobutylene and a Lewis acid catalyst as aluminum chloride.

The invention further relates to a method of safely and promptly terminating catalytic action of a Lewis acid-type catalyst, as $AlCl_3$, in a polymerization reaction wherein the reaction is about to become, or in the process of becoming, a "run-away" reaction with the possibility of becoming explosive.

BACKGROUND OF THE INVENTION

It has long been known that isobutylene can be polymerized into high molecular weight liquid polymers by the use of Lewis acid catalyst such as aluminum chloride. In the process, isobutylene, or isobutylene and butenes, or a mixture of $C_4$ olefins as isobutylene in the presence of other butenes or a "BB" stream comprising isobutylene, other butenes and butanes, is passed through a reactor in the presence of $AlCl_3$ catalyst at a temperature within the range of from about 0° F. to about 100° F. at a pressure sufficient to maintain the contents of the reactor in a liquid state. Usually the pressure is within the range of from about 7 psi to about 50 psi. The extent of polymerization is controlled by regulating the amount of catalyst introduced into the reactor, said amount being in the range of about 0.005 to about 1 weight percent, preferably about 0.05 to about 0.2 weight percent based on the amount of fresh isobutylene-butenes charged. The $AlCl_3$ is preferably introduced as a slurry about 5 to 10 wt % in hexane or other dispersing medium to obtain uniform contacting thereof with the undiluted olefin stream. The amount of $AlCl_3$ is preferably limited to obtain 80 to 90 percent conversion in an isothermal stirred tank reactor.

In the event of reaction malfunction, as for example, wherein catalyst is added to the reactor in excess of operational requirements, or temperature and pressure become excessive, since the polymerization reaction is exothermic, an explosive condition can readily occur. An immediate shutdown of the reaction is required to prevent a "run-away" butylene polymerization reaction since its reaction rate increases with temperature.

As an example, most commercial butylene polymerization processes to produce polybutene use solid $AlCl_3$ as catalyst. The heat of the exothermic polymerization reaction is typically removed with a refrigeration system. If for any reason the $AlCl_3$ catalyst is more active than conditions require, the heat generated can exceed the capacity of the cooling system. The temperature of the reactor content will rise. The rise in temperature accelerates the reaction and generates more heat. The "run-away" reaction is very dangerous and can result in explosion of the reactor.

Methods of terminating a butylene polymerization reaction have been described in the prior art. U.S. Pat. No. 2,918,508 teaches, in a recycle reaction to produce polyisobutylene, the reactor effluent is diluted with incoming isobutylene to avoid polymerization at an unduly high temperature and a molar excess of ammonia is added to the reactor effluent which is not recycled to further quench the reaction.

The method to terminate a butylene polymerization by dilution is suitable for use in a plug flow reactor where conversion per pass is low. In a stirred tank reactor, additional feed would increase the rate of polymerization. Addition of ammonia can aid in a liquid full reactor without liquid and vapor phases. In a boiling reactor with a liquid phase and a vapor phase, any gaseous agent, such as ammonia, added to the reaction to quench the reaction, would tend to boil up into the vapor phase, and react very little with the solid catalyst which remains in the liquid phase.

U.S. Pat. No. 2,628,991 teaches the elimination of catalytic activity from a gaseous stream containing reactive olefin hydrocarbons, such as isobutylene, wherein the catalyst is boron fluoride, $BF_3$, by means of the addition of low boiling dialkyl ether, preferably diethyl ether. The diethyl ether when dispersed into the gaseous olefin stream, particularly with some of the ether in the gaseous phase, acts very rapidly, even at low temperatures, to form a complex with the $BF_3$ and thus prevents undesired reaction of the reactive hydrocarbon. The gaseous olefin stream containing the $BF_3$ catalyst can also be reacted with the ether in contact with a nonvolatile oil slurry of sodium fluoride. The presence of the ether causes the $BF_3$ to react rapidly with the sodium fluoride to form a solid complex sodium fluoroborate, $NaBF_4$. However, in a stirred reactor with liquid and vapor phases and solid catalyst, use of a dialkyl ether, such as diethyl ether, with its low boiling point, is unsatisfactory. The ether escapes into the vapor phase and reacts little with solid catalyst in the liquid phase.

U.S. Pat. No. 2,521,940 teaches a method for removal of catalyst from the polymerization reaction effluent and polymer product in the polymerization of olefins wherein the reaction is catalyzed with a metal halide catalyst and promoted with a hydrogen halide catalyst promoter. Effluent from the reaction zone is admixed with alcohol to react with the metal halide catalyst to form an alcohol-metal halide complex which is insoluble in the effluent. The effluent is then contacted with water to dissolve the hydrogen halide promoter and reconvert the complex to the alcohol. U.S. Pat. No. 2,965,691 also teaches the use of a polar compound such as methanol to deactivate the catalyst system. U.S. Pat. No. 3,156,736 teaches deactivation of the catalyst by washing with an alcohol, water or other suitable material.

Water and alcohols require vigorous mixing to be dispersed rapidly in a butylene polymerization reaction to terminate the reaction. Vigorous mixing may not be available in an emergency. Also, water and alcohols, in concentrations of 20 to 100 ppm can act as promoters and accelerate the "run-away" reaction.

A run-away reaction can be handled by venting the reactor content with a pressure relief valve. However, the vent system must be very large to be effective to contain a run-away reaction. A rupture disk, or number of rupture disks, can be utilized. But a sufficiently large vent system can be uneconomical and use of rupture disks requires process downtime to replace the disks if the disks rupture.

Acetonitrile (ACN) has been proposed as a fast-acting emergency catalyst deactivator to deactivate Lewis acid-type catalysts in olefin polymerization reactions. Acetonitrile is highly toxic, both as the material and its combustion products. Water, alcohols, anhydrous ammonia nitriles, and other catalyst deactivators taught in the prior art can act as strong promoters and can accelerate the reaction when added in small amounts. The amount required of these agents to deactivate $AlCl_3$ catalyst is about 1:1 upon a molar basis. Insufficient addition of these agents can accelerate the reaction.

Despite the well-known methods of deactivating the Lewis acid-type catalyst used for polymerizing olefinic feedstocks, as evidenced by the above prior art, the termination of a run-away olefin polymerization reaction in a time period no greater than seconds has not been addressed wherein the deactivation is accomplished in a safe, expeditious and convenient manner.

Polymerization reactions of olefins to which the instant invention is applied include the polymerization of 1-butene to poly-1-butene in the presence of a promoter such as a chloride and a Lewis acid-type catalyst, the polymerization of isobutylene to polyisobutylene in the presence of a Lewis acid-type catalyst, the polymerization of propylene to polypropene in the presence of a Lewis acid-type catalyst, and the polymerization of alphamethylstyrene to poly-alphamethylstyrene in the presence of a Lewis acid-type catalyst.

It is therefore an object of this invention to provide a method for rapidly deactivating the above polymerization reactions in the presence of a Lewis acid-type catalyst within a time period of 30 seconds or less when reaction pressure approaches pre-set limits based on equipment design factors. Although these pre-determined pressures can be of any suitable value, maximum pressures initiating reaction termination are typically less than 250 psig as equipment designed for higher pressures would be uneconomical under normal process conditions.

It is an object of this invention to provide a process for deactivating a run-away olefin polymerization reaction wherein the reaction is killed almost instantaneously, that is, within a period of 30 seconds or less. It is further an object of this invention to utilize a reaction kill-agent which is non-toxic, is completely miscible with hydrocarbon solvent so that it can be easily dispersed in the reactor, is very high boiling so that it is not easily lost via the vent system, is not a promoter for olefin polymerization, forms a complex with Lewis acid-type catalysts with very little liberation of heat, is soluble in water, and is easily removable from the reactor products after the reaction is killed.

It is an object of this invention to provide a method for termination of a polymerization reaction of a reactive olefin under emergency conditions wherein said reaction is catalyzed with a Lewis acid-type catalyst, the reactor is a stirred, boiling-type reactor, reactor contents comprise a liquid phase and a vapor phase, and the method of termination does not involve a toxic substance.

It is further an object of this invention to provide a process for deactivating Lewis acid-type catalyzed olefin polymerizations wherein $AlCl_3$, or $BF_3$ or complexes of $BF_3$ are the catalysts. Other Lewis acid-type catalysts can be used such as aluminum bromide.

Surprisingly, it has been found that diglyme, diethylene glygol dimethyl ether, forms a complex rapidly with Lewis acid-type catalysts and effectively terminates catalytic activity within seconds of contact with the catalyst. Since diglyme does not act as a promoter, addition of insufficient diglyme does not accelerate the reaction, as do water, alcohol, and other deactivating agents. Addition of insufficient diglyme means a less efficient deactivation. Diglyme is not toxic.

SUMMARY OF THE INVENTION

The present invention relates to a method wherein a "run-away" reaction in a stirred tank reactor with liquid-vapor phases polymerizing reactive olefin hydrocarbons in the presence of a Lewis acid-type catalyst, wherein the reaction can become explosive, can be terminated within seconds. Catalytic action of the Lewis acid-type catalyst is eliminated safely and promptly in the polymerization reaction.

DETAILS OF THE INVENTION

It has long been known that reactive olefins can be polymerized into high molecular weight liquid polymers by the use of Lewis acid-type catalysts such as aluminum chloride and boron fluoride. The object of this invention is to provide a practical, economic method for "killing" a polymerization reaction of reactive olefins such as propylene, alpha-methylstyrene, isobutylene, or a polymerization reaction of isobutylene in the presence of other butenes, or a so-called "BB" stream comprising isobutylene, other butenes and butanes, wherein the reaction rate has become excessive and the reaction is about to become, or is in the process of becoming, a "run-away" reaction with the possibility of becoming explosive.

The polymerization of reactive olefins such as 1-butene, propylene, alpha-methylstyrene, isobutylene, or isobutylene in the presence of other butenes, or a BB stream comprising isobutylene, other butenes and butanes is a highly exothermic reaction. Refrigeration is typically employed to control reaction temperature within relatively narrow limits, with an upper limit of approximately 50°–60° F. of the reaction temperature. The reactor can be a stirred tank. The reaction rate is controlled by regulating the amount of catalyst that is introduced into the reaction zone.

Polymerization reactions of 1-butene to obtain poly-1-butene, of propylene to obtain polypropene, and of alpha-methylstyrene to obtain poly-alphamethylstyrene are catalyzed by a Lewis acid-type catalyst in a method in the manner of polymerizing isobutylene but with increased pressures and temperatures. As with the polymerization of isobutylene, the reaction is controlled by regulating the amount of catalyst introduced into the reactor. Since the reaction is exothermic, an explosive condition can readily occur, necessitating immediate shutdown of the reaction to prevent the explosion.

In the polymerization of isobutylene in a BB stream, the amount of catalyst, aluminum chloride, is in the range of about 0.05% to about 0.2%, based on the amount of BB stream charged to the reactor. Pressure is in the range of from about 7 to about 50 psia. Conversion of the reactive olefin to polymer is in the range of from about 70% to about 90%, based on isobutylene in the feed. The polymerization reaction is carried out by contacting the catalyst, aluminum chloride, with the reactive olefin which can be introduced into the reaction vessel in liquid form. The temperature of the system is within the range of from about 0° F. to about 100° F. As a general rule, the rate of polymerization of isobutylene increases as the reaction temperature is increased. Residence time of the reactive olefins in the reactor is about 30 to 60 minutes.

The polymer products, polyisobutylene, polypropene and poly-1-butene, are useful for many purposes but their outstanding utility is as an additive for lubricating oils for improving four important engine performance characteristics, namely motor oil mileage, gasoline mileage, cold starting and octane-requirement increase. Polyalphamethylstyrene has many industrial uses.

Stopping or quenching of the reaction can be accomplished by stopping the feed rate and by venting the reactor to remove the reactive olefin in the reactor. Quenching the reaction can be accomplished by addition of a necessary amount of water to break down the catalyst. Addition of alcohol and other polar compounds will also quench the reaction if added in adequate amounts and are adequately mixed quickly by the agitation to deactivate the catalyst. However, these techniques can require a time period greater than is available in an emergency situation and, in an emergency, the agitation may fail.

An effective process for quenching a polymerization reaction of reactive olefins, to be effective in an emergency situation, must act to kill the reaction instantaneously, and to be "fail-safe" to as great a degree as possible. If the process uses an additive to kill the reaction, the additive must kill the polymerization reaction immediately, is preferably non-toxic, is preferably miscible with reactor contents so that the additive can be easily dispersed in the reactor liquid phase, is sufficiently high boiling so that it remains in the reactor liquid phase and does not boil off through the vent system, does not promote reactive olefin polymerization, liberates little or no heat as it deactivates the catalyst, and the additive and its reaction products are easily separated from unreacted hydrocarbon and polymer in succeeding process steps.

The use of acetonitrile has been evaluated as an emergency catalt kill agent for polymerization reactions of reactive olefins in the presence of Lewis acid-type catalysts. The toxicity of acetonitrile and its combustion products, despite the effectiveness of acetonitrile in immediately quenching the polymerization reaction, is a deterrent to such use.

As an example, in an emergency "kill" system for a polyisobutylene reactor wherein diglyme (diethylene glycol dimethyl ether) is used as the agent to stop the polymerization reaction of isobutylene or of isobutylene and butenes or of a BB stream in the presence of aluminum chloride as catalyst, the required amount of diglyme is stored in a vessel under pressure of a non-reactive gas such as nitrogen. Pressure is at least 50 psi higher than maximum reactor pressure. A transfer line links the diglyme storage tank with the reactor. When the reactor reaches a certain predetermined pressure, a pressure greater than 100 psig, a valve between the diglyme storage vessel and the reactor is activated and all the diglyme is introduced into the reactor. The reaction is terminated within a maximum of 30 seconds. If the agitation fails, boiling turbulence is adequate to disperse diglyme.

Upon cessation of the polymerization reaction, the contents of the reactor are removed and transferred to a water wash. Upon contact with water, the catalyst-diglyme complex decomposes. A settling tank separates the water phase and polymer phase. The polymer phase is pumped to storage and the water phase containing discarded aluminum chloride catalyst is pumped to waste treatment facilities.

It is known that diglyme has been used as a cocatalyst in the polymerization of olefins with a Ziegler-Natta type catalyst (see U.S. Pat. Nos. 3,669,948; 4,086,185; 4,177,160). It is therefore surprising that diglyme can be used to terminate an olefin polymerization reaction with a Lewis acid-type catalyst.

In summary, the instant invention comprises a method for termination of a polymerization reaction of a reactive olefin in the presence of a Lewis acid-type catalyst wherein the reactor is a stirred, boiling-type reactor, reactor contents comprise a liquid phase and a vapor phase, which method comprises (a) storing in a pressure vessel a quantity of diglyme sufficient to terminate said polymerization reaction, said pressure vessel is connected to said reactor by a transfer line with means to control injection of said diglyme into said reactor, (b) subjecting said diglyme in said pressure vessel to a pressure differential of at least 50 psig greater than pressure in said reactor to cause said diglyme to be injected into said reactor within a period of 30 seconds or less, (c) monitoring pressure of said polymerization reactor, (d) injecting said diglyme into said reactor by said transfer line when a termination pressure in said reactor is in the range of from about 100 psig to about 250 psig to terminate said polymerization reaction within 30 seconds or less and to form a diglyme-catalyst complex, (e) transferring contents of said reactor to a water wash vessel to decompose said complex and to form a water phase and a polymer phase, and (f) recovering said polymer phase. The Lewis acid-type catalyst can be selected from the group consisting of $AlCl_3$, $AlBr_3$, $BF_3$ and complexes of $BF_3$. The reactive olefin can be selected from the group consisting of isobutylene, isobutylene in the presence of other butenes, propylene, 1-butene, alpha-methylstyrene, and a BB stream comprising isobutylene, other butenes and butanes.

In more detail, the olefin can be isobutylene, or isobutylene butenes, or a BB stream, the catalyst can be $AlCl_3$, and the termination pressure is from about 100 psig to about 150 psig for polyisobutylene. Termination pressure is from about 150 psig to about 200 psig wherein the olefin is 1-butene and the polymer is poly-1-butene. For polypropene from propylene, termination pressure is from about 200 psig to about 250 psig, and for poly-alphamethylstyrene from alpha-methylstyrene, termination pressure is from about 100 psig to about 150 psig.

The following example illustrates the invention more specifically.

EXAMPLE I

In a laboratory simulation of the invented process, an isobutylene-butene feedstock, 780 grams, was added to a 2-liter autoclave. Composition was as follows:

|  | Wt % |
| --- | --- |
| $C_3$'s | 0.5 |
| Isobutane | 35 |
| n-Butane | 8 |
| Isobutylene | 20 |
| 1-Butene | 15 |
| cis-2-Butene | 8.5 |

|  | Wt % |
| --- | --- |
| trans-2-Butene | 13 |
| C<sub>5</sub>'s | trace |
| Other Impurities | trace |

The autoclave was insulated. No reactor cooling was employed. Reactor contents were heated to 93° F. and 2 grams of AlCl$_3$ catalyst were flushed into the autoclave with 220 grams of the isobutylene-butene feed. A violent reaction took place immediately with a corresponding rapid rise in reaction zone temperature. When the reaction zone temperature reached 132° F., 3.2 cc of diglyme premixed in 20 cc of hexane was added to the reaction zone under nitrogen pressure. The temperature rise was slowed almost instantaneously. The reaction was totally terminated in nine seconds.

What is claimed is:

1. A method for termination of a polymerization reaction of a reactive olefin under emergency conditions to prevent a "run-away" reaction in the presence of a Lewis acid-type catalyst, and to recover polymer therefrom, wherein the reactor is a stirred, boiling-type reactor, reactor contents comprise a liquid phase and a vapor phase, which method comprises:
   (a) storing in a pressure vessel a quantity of diglyme sufficient to terminate said polymerization reaction, said pressure vessel connected to said reactor by a transfer line with means to control injection of said diglyme into said reactor,
   (b) subjecting said diglyme in said pressure vessel to a pressure differential at least 50 psig greater than pressure in said reactor to cause said diglyme to be injected into said reactor within a period of 30 seconds or less,
   (c) monitoring pressure of said polymerization reaction,
   (d) injecting said diglyme into said reactor by said transfer line when termination pressure of said reaction is within the range of from about 100 psig to about 250 psig to terminate said reaction within 30 seconds or less and to form a diglyme catalyst complex,
   (e) transferring contents of said reactor to a water wash vessel to decompose said complex and to form a water phase and a polymer phase, and
   (f) recovering said polymer phase.

2. The method of claim 1 wherein said Lewis acid-type catalyst is selected from the group consisting of AlCl$_3$, AlBr$_3$, BF$_3$ and complexes of BF$_3$, said reactive olefin is selected from the group consisting of isobutylene, isobutylene in the presence of other butenes, propylene, alpha-methylstyrene, and a BB stream comprising isobutylene, other butenes and butanes.

3. The method of claim 1 wherein said Lewis acid-type catalyst is AlCl$_3$, said reactive olefin is selected from the group consisting of isobutylene, isobutylene in the presence of other butenes, and a BB stream comprising isobutylene, other butenes and butanes, and said termination pressure is from about 100 psig to about 150 psig.

4. The method of claim 1 wherein said Lewis acid-type catalyst is selected from the group consisting of BF$_3$ and complexes of BF$_3$, said reactive olefin is selected from the group consisting of isobutylene, isobutylene in the presence of other butenes, and a BB stream comprising isobutylene, other butenes, and butanes, and said termination pressure is from about 100 psig to about 150 psig.

5. The method of claim 1 wherein said Lewis acid-type catalyst is selected from the group consisting of AlCl$_3$, BF$_3$ and complexes of BF$_3$, said reactive olefin is 1-butene and said termination pressure is from about 150 to about 200 psig.

6. The method of claim 1 wherein said Lewis acid-type catalyst is selected from the group consisting of AlCl$_3$, BF$_3$ and complexes of BF$_3$, said reactive olefin is propylene and said termination pressure is from about 200 psig to about 250 psig.

7. The method of claim 1 wherein said Lewis acid-type catalyst is selected from the group consisting of AlCl$_3$, BF$_3$ and complexes of BF$_3$, said reactive olefin is alpha-methylstyrene and said termination pressure is from about 100 psig to about 150 psig.

* * * * *